United States Patent [19]

Bhattacharya

[11] 4,143,734
[45] Mar. 13, 1979

[54] MANUAL CONTROL DEVICE FOR AUTOMOTIVE VEHICLE

[76] Inventor: Bishnu P. Bhattacharya, 364 Rindge Ave., Apt. 17C, Cambridge, Mass. 02140

[21] Appl. No.: 722,152

[22] Filed: Sep. 10, 1976

[51] Int. Cl.² .................... B60K 26/02; G05G 13/00
[52] U.S. Cl. .................... 180/77 R; 74/481; 74/482; 74/484 R
[58] Field of Search ............ 180/77 R, 78; 74/480, 74/481, 482, 484, 486, 487

[56] References Cited

U.S. PATENT DOCUMENTS

| | | | |
|---|---|---|---|
| 1,593,876 | 7/1926 | Learmont | 180/77 R |
| 2,207,954 | 7/1940 | Tate | 74/487 |
| 2,777,335 | 1/1957 | Engberg et al. | 74/481 |
| 2,826,089 | 3/1958 | Hammack | 74/481 |
| 2,899,835 | 8/1959 | Moreland | 74/481 |
| 3,226,997 | 1/1966 | Malloy | 74/482 |
| 3,472,094 | 10/1969 | Lake et al. | 74/481 |
| 3,960,030 | 6/1976 | Williams | 74/481 |

*Primary Examiner*—Robert R. Song
*Assistant Examiner*—Donn McGiehan
*Attorney, Agent, or Firm*—Daniel Jay Tick

[57] ABSTRACT

A pair of hand grips are clamped to a steering wheel. The grips are connected by a pair of cables extending through flexible tubes to opposite ends of a pivotable bar mounted on the steering column of the steering wheel. The opposite ends of the pivotable bar are respectively affixed to the accelerator pedal and the brake pedal of a vehicle. Pressure applied by the hands of the operator on the hand grips selectively depresses the accelerator pedal and the brake pedal. Springs mounted in the hand grips and at the distal ends of the tube maintain the cables in open position yieldable to pressure on the hand grips.

1 Claim, 6 Drawing Figures

MANUAL CONTROL DEVICE FOR AUTOMOTIVE VEHICLE

BACKGROUND OF THE INVENTION

The present invention relates to a manual control device for an automotive vehicle.

Objects of the invention are to provide a manual control device for an automotive vehicle, which device permits an operator to manually control the operation of a motor vehicle while gripping the steering wheel with both hands and permitting full rotation of the steering wheel beyond 90°.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The manual control device of the invention is for an automotive vehicle 15 (FIG. 1) having a steering column 38 (FIGS. 2 and 3), a steering wheel 14 (FIGS. 1 to 3) rotatably mounted on the steering column, an accelerator pedal 48 (FIG. 4) and a brake pedal (not shown in the FIGS.).

Figure 3:
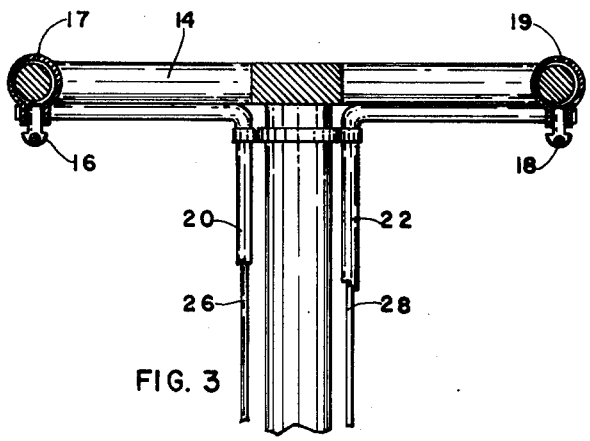
FIG. 3 is a view, on an enlarged scale, taken along the lines III—III, of FIG. 2.

The manual control device of the invention comprises a pivotable bar 34 having spaced opposite first and second ends 30 and 32, respectively, as shown in FIG. 3. The pivotable bar 34 is pivotally affixed, via a pivot pin 36 (FIG. 3), to the steering column 38 in spaced relation with the steering wheel 14 at a point equidistant from the first and second ends 30 and 32 thereof (FIG. 3).

A securing plate 24 is affixed to the steering column 38 between the steering wheel 14 and the pivotable bar 34, and spaced from said wheel and said bar, as shown in FIG. 3. The securing plate 24 has diametrically opposite first and second points 23 and 25, respectively (FIG. 3).

Figure 4:
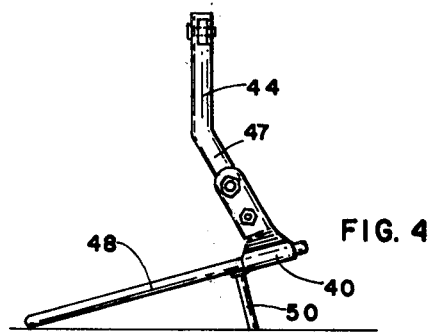
FIG. 4 is a side view of a pedal coupling of the manual control device of the invention.

A first sleeve 40 (FIGS. 3 and 4) is mounted on the forward part of the accelerator pedal 48 (FIG. 4). A second sleeve 42 (FIG. 3) is mounted on the forward part of the brake pedal (not shown in the FIGS.). The accelerator pedal 48 controls the speed of the vehicle 15 via a coupling rod 50 (FIG. 4).

Figure 2:
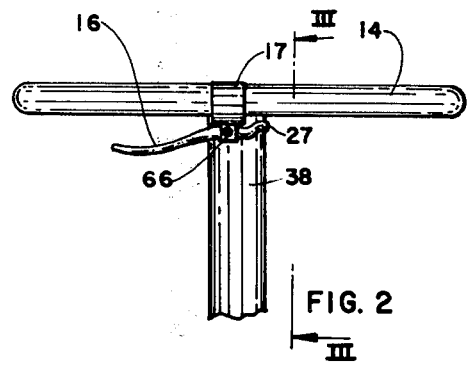
FIG. 2 is a side view, on an enlarged scale, of a hand grip of the manual control device of the invention.
Figure 6:
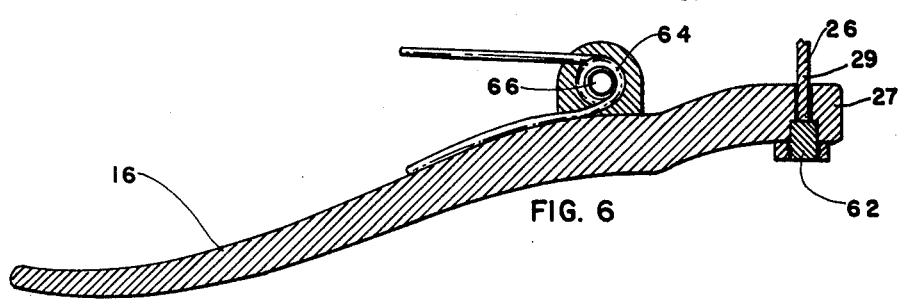
FIG. 6 is a view, on an enlarged scale, partly in section, of a hand grip and pivotal connector of the manual control device of the invention.

A first pivotal connector 17 (FIGS. 2 and 3) pivotally affixes a first hand grip 16 (FIGS. 2, 3 and 6) to the steering wheel 14, as shown in FIGS. 2 and 3. The first pivotal connector 17 has a spring 64 (FIG. 6) for maintaining the first hand grip 16 open, in its position shown in FIGS. 2 and 6. A bolt 66 secures the spring 64 between the first hand grip 16 and the first pivotal connector 17 (FIGS. 2 and 6). The first hand grip 16 has a free end 27 (FIGS. 2 and 6).

A second pivotal connector 19 (FIG. 3) pivotally affixes a second hand grip 18 (FIG. 3) to the steering wheel 14. The second pivotal connector 19 has a spring (not shown in the FIGS.) for maintaining the second hand grip 19 open. The second hand grip 19 has a free end.

A first flexible tube 20 (FIG. 3) is supported by the steering column 38 (FIG. 3) and extends from the free end 27 of the first hand grip 16 to the first point 23 of the securing plate 24, as shown in FIG. 3. A second flexible tube 22 (FIGS. 3 and 5) is supported by the steering column 38 (FIG. 3) and extends from the free end of the second hand grip 18 to the second point 25 of the securing plate 24, as shown in FIG. 3.

A first cable 26 (FIGS. 3 and 6) slidably extends through the first tube 20 and has a first end 29 (FIG. 6) affixed to the free end 27 of the first hand grip 16 and a spaced opposite second end (not shown in the FIGS.) affixed to the first end 30 of the pivotable bar 34. A coupling device 62 secures the first end 29 of the first cable 26 to the free end 27 of the first hand grip 16 (FIG. 6). A second cable 28 (FIGS. 3 and 5) slidably extends through the second tube 22 and has a first end (not shown in the FIGS.) affixed to the free end of the second hand grip 18 and a spaced opposite second end 31 (FIG. 5) affixed to the second end 32 of the pivotable bar 34.

A first rod 44 (FIGS. 3 and 4) has a first end 45 affixed to the first end 30 of the pivotable bar 34 (FIG. 3) and a spaced opposite second end 47 affixed to the first sleeve 40 (FIGS. 3 and 4). A second rod 46 (FIG. 3) has a first end 49 affixed to the second end 32 of the pivotable bar 34 (FIG. 3) and a spaced opposite second end 51 affixed to the second sleeve 42 (FIG. 3).

A first collar (not shown in the FIGS.) is provided in the first tube 20 in the area of the second end 53 of said first tube (FIG. 3). A second collar 54 (FIG. 5) is provided in the second tube 22 in the area of the second end 55 of said second tube (FIGS. 3 and 5).

A first spring (not shown in the FIGS.) is positioned around the first cable 26 in the first tube 20. The first spring has a first end abutting the first collar and a spaced opposite second end beneath the first end (not shown in the FIGS.). A first washer (not shown in the FIGS.) is affixed to the first cable 26 in the first tube 20 via a first nut (not shown in the FIGS.) and abuts the second end of the first spring. The first spring maintains the first cable 26 in extended position.

Figure 5:
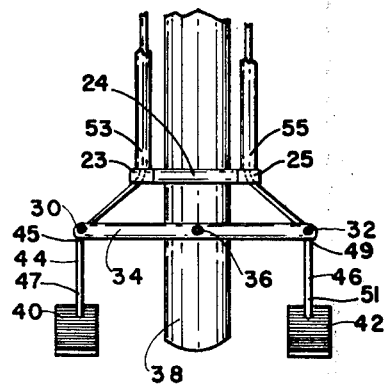
FIG. 5 is a view, on an enlarged scale, partly in section, of a spring and cap of the manual control device of the invention.

A second spring 52 (FIG. 5) is positioned around the second cable 28 in the second tube 22, as shown in FIG. 5. The second spring 52 has a first end 57 abutting the second collar 54 and spaced opposite second end 59 beneath said first end, as shown in FIG. 5. A second washer 56 is affixed to the second cable 28 in the second tube 22 via a second nut 58 and abuts the second end 59 of the second spring 52, as shown in FIG. 5. The second spring 52 maintains the second cable 28 in extended position.

A first cap (not shown in the FIGS.) is removably affixed to the second end 53 of the first tube 20 for maintaining the first cable 26 in open position. A second cap 60 (FIG. 5) is removably affixed to the second end 55 of the second tube 22 for maintaining the second cable 28 in open position.

Figure 1:
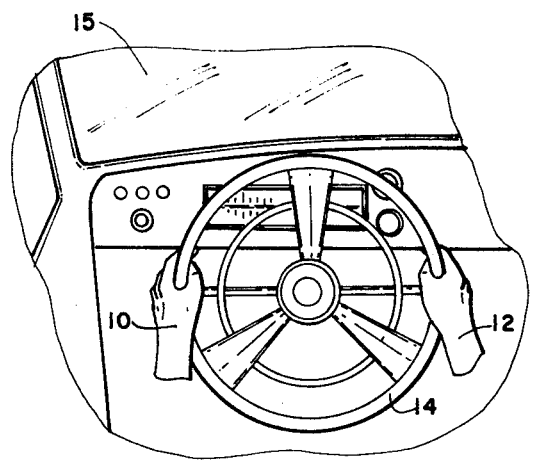
FIG. 1 is a schematic diagram illustrating how the manual control device of the invention is used.

The operator of the vehicle 15 uses both hands 10 and 12 to grip the steering wheel 14, as shown in FIG. 1, and controls the braking of the vehicle with his or her right hand 12 via the first hand grip 16 and the acceleration of the vehicle with his or her left hand 10 via the second hand grip 18. When the operator of the vehicle applies pressure to one of the first and second hand grips 16 and 18, the corresponding end 30 or 32 of the pivotable bar 34 is raised and the other end of said pivotable bar is lowered. This results in either braking or acceleration of the vehicle, but not both simultaneously. Thus, if the operator presses the first hand grip 16 with his or her right hand 12, said first hand grip raises the first end 30 of the pivotable bar 34, so that the second end 32 of said pivotable bar is lowered and depresses the brake pedal via the rod 46 and the sleeve 42 (FIG. 3). The vehicle is thereby braked.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A manual control device for an automotive vehicle having a steering column, a steering wheel rotatably mounted on the steering column, an accelerator pedal and a brake pedal, said manual control device comprising
   a pivotable bar having spaced opposite first and second ends, said pivotable bar being pivotally affixed to the steering column in spaced relation with the steering wheel at a point equidistant from the first and second ends thereof;
   a securing plate affixed to said steering column between said steering wheel and said pivotable bar and spaced from said wheel and said bar, said securing plate having diametrically opposite first and second points;
   a first sleeve on part of the accelerator pedal;
   a second sleeve on part of the brake pedal;
   a first hand grip;
   a first pivotal connector pivotally affixing said first hand grip to said steering wheel; said first pivotal connector having a spring for maintaining said first hand grip open, said first hand grip having a free end;
   a second hand grip;
   a second pivotal connector pivotally affixing said second hand grip to said steering wheel in spaced opposite relation with said first hand grip, said second pivotal connector having a spring for maintaining said second hand grip open, said second hand grip having a free end;
   a first flexible tube supported by said steering column and extending from the free end of said first hand grip to the first point of said securing plate;
   a second flexible tube supported by said steering column and extending from the free end of said second hand grip to the second point of said securing plate;
   a first cable slidably extending through said first tube and having a first end affixed to the free end of said first hand grip and a spaced opposite second end affixed to the first end of said pivotable bar;
   a second cable slidably extending through said second tube and having a first end affixed to the free end of said second hand grip and a spaced opposite second end affixed to the second end of said pivotable bar;
   a first rod having a first end affixed to the first end of said pivotable bar and a spaced opposite second end affixed to said first sleeve;
   a second rod having a first end affixed to the second end of said pivotable bar and a spaced opposite second end affixed to said second sleeve;
   a first collar in said first tube in the area of the second end thereof;
   a second collar in said second tube in the area of the second end thereof;
   a first spring around said first cable in said first tube, said first spring having a first end abutting said first collar and a spaced opposite second end beneath said first end;
   a first washer affixed to said first cable in said first tube and abutting the second end of said first spring;
   a second spring around said second cable in said second tube, said second spring having a first end abutting said second collar and a spaced opposite second end beneath said first end;
   a second washer affixed to said second cable in said second tube and abutting the second end of said second spring;
   a first cap removably affixed to the second end of said first tube for maintaining said first cable in open position; and
   a second cap removably affixed to the second end of said second tube for maintaining said second cable in open position.

* * * * *